Figure 1:
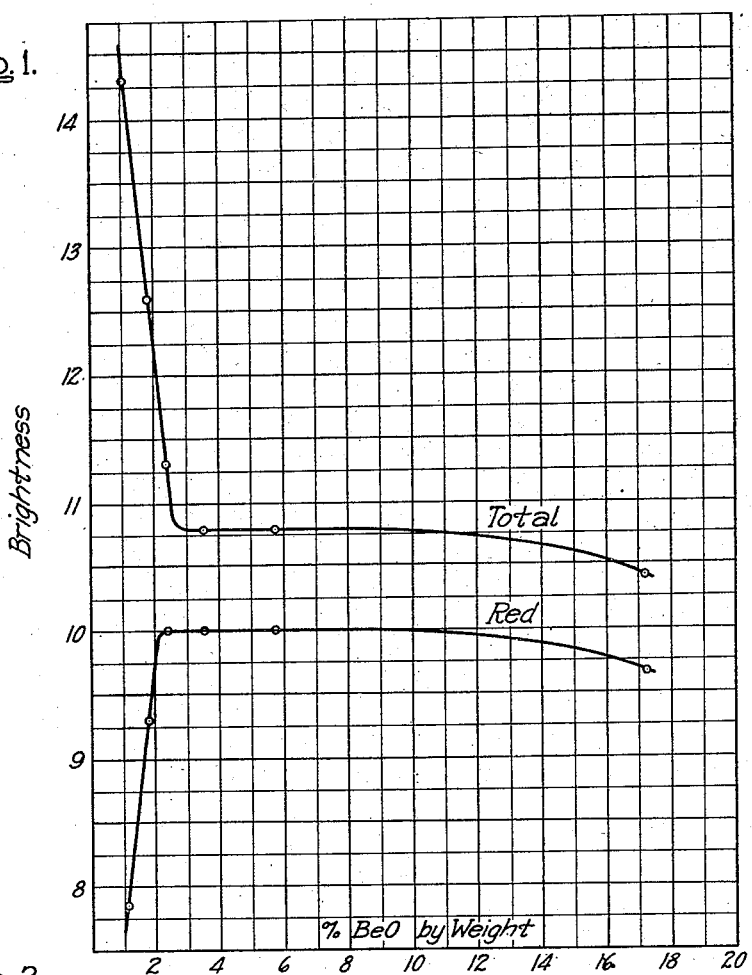

June 22, 1948.   H. C. FROELICH   2,443,728
LUMINESCENT MATERIALS
Filed Feb. 25, 1943

Inventor:
Herman C. Froelich,
by John H. Anderson
His Attorney.

Patented June 22, 1948

2,443,728

UNITED STATES PATENT OFFICE 2,443,728

LUMINESCENT MATERIALS

Herman C. Froelich, Cleveland, Ohio, assignor to General Electric Company, a corporation of New York Application February 25, 1943, Serial No. 477,060

5 Claims. (Cl. 252—301.6)

This invention relates to electric fluorescent lamps or tubes, and particularly to luminescent materials or phosphors. The invention is concerned with the luminescent efficiency and radiant output of phosphors in fluorescent lamps—including lamps of the ordinary positive-column discharge type—and with maintaining this output at a relatively high level during the life of a lamp, as contrasted with the usual serious decline of the output below its initial level. The invention is applicable especially to the zinc-beryllium silicate type of phosphor, which is much used in admixture with other phosphors to produce a white light or an artificial daylight.

Phosphors consist in general of a major proportion of a so-called base material or matrix and a minor proportion of another material called an activator. Several activators may co-operate in the fluorescence of a phosphor, and the matrix may also be composite, consisting of several substances intimately interincorporated. The luminescent qualities of the phosphor generally depend on the relations between matrix and activator materials as determined by heat treatment which they undergo together, as well as on the materials themselves and their relative proportions. The activator material appears to be in solid solution in the matrix material; or, otherwise stated, it seems to be taken up into the structural lattice of the matrix, either as a network forming constituent or as a network modifying one, or both. The exact interrelations amongst the components of a phosphor may be difficult to determine, and in cases of any complexity, it may even be hard to know which components belong to the matrix and which are activators. Apparently it is the metal of an activator that determines its special luminescent effect, although this metal is usually present in the phosphor as a compound.

When activated with manganese, zinc orthosilicate ($Zn_2SiO_4$, or $2ZnO \cdot SiO_2$, as it is sometimes written) may give either a green fluorescence or a yellow fluorescence under excitation by the 2537 Å. resonance radiation of the mercury arc discharge in a fluorescent lamp. Zinc silicate phosphor containing an excess of silica and giving a weak red fluorescence is also known. In general, zinc silicate phosphors may be prepared by mixing together zinc oxide (ZnO), silica ($SiO_2$), and manganese oxide (MnO) or the like, and firing this raw mixture for a sufficient length of time at a suitable temperature, with exposure to the atmospheric air. By including beryllium oxide (BeO) along with the other ingredients mentioned, it has been found possible to influence the color of the fluorescent light from the phosphor: in fact, a whole series of colors ranging from green through greenish-yellow and orange to red may be produced, depending on the proportions of beryllia, manganese, and silica. Red phosphors of this type show much greater brightness of fluorescence than does red zinc silicate phosphor containing an excess of silica as mentioned above. The quality and brightness of the fluorescent light from such phosphors are greatly influenced by the heat treatment employed in their manufacture.

As regards the actual composition of these silicate phosphors containing zinc and beryllium together with manganese, various views have been entertained. It has been suggested that the phosphor consists of a matrix of zinc orthosilicate ($Zn_2SiO_4$ or $2ZnO \cdot SiO_2$), with manganese and beryllium as co-operating activators therefor. Another view is that the phosphor matrix comprises zinc and beryllium orthosilicates, the latter in solid solution in the former, and that the activating manganese component is also in solution in the zinc orthosilicate. The crystals of beryllium silicate and of zinc silicate being isomorphous, the essential matrix has been conceived of as $2ZnO \cdot SiO_2$ in which more or less of the zinc is replaced with beryllium—so that the molar sum of zinc and beryllium in the matrix would always be equal to 2 for each molal of silica—and the matrix has been termed a "zinc-beryllium orthosilicate." This has led to a general opinion that an excess of any component of the system ZnO, BeO, $SiO_2$ over a "stoichiometric" 2-mol orthosilicate formula is a mere inert diluent, and thus pro tanto a factor of inefficiency.

On the other hand, it has been found that phosphors containing an excess of silica over the "stoichiometric" orthosilicate formula—as exemplified in Patent No. 2,245,414 to Roberts—are easier to produce and to duplicate exactly. Such a phosphor, which gives a pink or reddish yellow light when excited by the 2537 Å. resonance radiation of mercury, may be mixed with fluorescent magnesium tungstate (producing a light blue visible radiation) to obtain a white light of quality corresponding to a color temperature of 3500° K., or with magnesium tungstate and cadmium borate to obtain a light of daylight quality.

I have discovered that by a novel combination or correlation of components, suitably prepared, an exceptionally high efficiency of reddish or pinkish fluorescence (ranging from a light orange or peach to a strong pink) can be obtained, combined with a very substantial improvement in the maintenance of the apparent fluorescent brightness of the luminescent material during the useful life of a lamp. E. g., in a white-light or daylight mixture such as above described, my zinc-beryllium silicate composition can be made to give some 5-8 per cent more light after 1750 hours operation of the lamp than do the best zinc-beryllium silicate phosphors heretofore available. Speaking in a general way, my luminescent composition may be characterized as consisting essentially of a complex of silica with zinc, beryllium, and manganese oxides intimately combined together, so that the complex comprises zinc orthosilicate as at least a major matrix material, together with beryllium orthosilicate and a manganese component, both in solution in the zinc orthosilicate and functioning as color-determining or influencing phosphor constituents.

To obtain the optimum or desired hue and brightness of reddish fluorescence in my phosphor, an adequate proportion of manganese is required, as well as beryllium. However, the presence of manganese in adequate proportion limits "solution" of beryllium component(s) in the zinc orthosilicate to a maximum amount corresponding to about a molar ratio of $(ZnO+BeO):SiO_2 = 1.8$ to $1.9$ so that any excess of beryllium over what is called for by this formula would be in some other or less intimate relation to the zinc silicate than the part corresponding to this formula, and would not qualitatively affect the fluorescence of the phosphor materially. Stated the other way around, the formula becomes $SiO_2:(ZnO+BeO) = .55$ to $.53$ as against $SiO_2:2ZnO = .5$, which accords with the fact that I have found it actually impossible to carry to completion the reaction for producing a phosphor corresponding to the supposed stoichiometric zinc-beryllium orthosilicates $(ZnO+BeO):SiO_2 = 2$ when the percentage of manganese present approaches that required for optimum color and brightness.

As compared with the Roberts phosphor for use with fluorescent magnesium tungstate in lamps producing light of 3500° K. color temperature, my luminescent material for the same purpose is not only characterized by a much higher molar ratio of $(ZnO+BeO)$ to $SiO_2$, ranging at the optimum above about 1.8 and even as high as about 1.9, but also by a higher partial molar ratio of ZnO to $SiO_2$, about 1.7, figures which imply 0.1 or higher as the partial molar ratio of BeO to $SiO_2$. The exact value of the partial molar ratio $ZnO:SiO_2$ is influenced somewhat by the proportion of activating manganese used. For the percentage of manganese required in my phosphor when intended for use in producing 3500° K. white light, as indicated hereinafter, $ZnO:SiO_2 = 1.70$ is about right; while variation of the manganese to adapt my phosphor for use in producing a different quality of "white light" might lower this value to something like 1.68 or even further toward 1.6 for an increase in the manganese to produce a deeper red, or raise the value to something like 1.72 or even further toward 1.8 for a decrease in the manganese to change the quality of the light in the opposite direction. If the partial molar ratio $ZnO:SiO_2$ falls materially below the indicated value, so much of the BeO can be taken into the phosphor as a color-determining component that the desired stabilizing BeO will be deficient, and the desired brightness and maintenance of fluorescence in lamps cannot be obtained; while if the ratio goes above this value materially, the fluorescent color tends to reverse itself, from red to green. Furthermore, it is apparent that any increase in the partial molar ratio of $ZnO:SiO_2$ from 1.7 toward 1.8+ means a corresponding reduction in the more influential part of the BeO that is fully functional in determining or influencing the color and intensity of fluorescence, regardless of what the total beryllium content may be. An increase in the proportion of manganese in the phosphor would have a similar effect in reducing the amount of BeO that would be fully functional as regards the fluorescent color, while a reduction in the proportion of manganese would have the opposite effect.

Besides the strict phosphor components, including material that is functional in color determination as above set forth, my complex comprises other material, that is held in a special relation to the rest of complex and consists of metal compound(s), of beryllium or equivalent(s) such as magnesium or even aluminum, hereinafter referred to as compound of metal of the group comprising beryllium, magnesium, and aluminum. Of course this other material in special relation to the rest of the complex may consist partly of beryllium compound and partly of its stated equivalent(s). I have found that when properly combined in the luminescent complex, such an excess of beryllium (or equivalents) over the limited amount that is functional in color determination exerts a stabilizing influence on the output from the phosphor during its use in a lamp, and thus materially improves the maintenance of fluorescent output from the lamp. To obtain the best maintenance of apparent fluorescent output, the partial molar ratio of BeO to $SiO_2$ should materially exceed the above-stated value of about 0.1 or more, corresponding to the above-stated molar ratio value of 1.8+. An excess of about 20 per cent of BeO assures substantial improvement as regards maintenance of fluorescent brightness, while an excess of about 400 per cent gives as much benefit as seems to be attainable. In general, the maximum proportions of beryllia and manganese oxide required are only about 4 per cent of each in relation to the phosphor as a whole.

Silica (i. e., $SiO_2$) additional to that of the silicates already mentioned is also present in my luminescent complex as produced, whether in the free state, or as orthosilicate representing the above-mentioned metal compound that is not strictly a phosphor component. While excess silica has in a way been present in prior zinc-beryllium orthosilicate phosphor, a beryllium compound or the like in stabilizing relation to the rest of the material is altogether novel.

While the relation of my beneficial excess of beryllium component(s) to the rest of the composition, including the zinc silicate, must be somehow different from that of the color-determinative part of the beryllium, this relation is evidently more intimate than mere mechanical intermixture: first, because this excess does not proportionately reduce the fluorescent brightness, as a mere inert diluent would do; secondly, because a simple excess of beryllia mechanically admixed after firing with a phosphor corresponding to the formula $(ZnO+BeO):SiO_2 = 1.8+$ does proportionately reduce the fluorescent brightness without at all improving the apparent fluorescent maintenance. To be beneficial in this last respect, an excess of beryllia must be incorporated by firing, and preferably in the very preparation of the composition. Without advancing the considerations below as conclusive regarding the relations between excess silica and excess beryllia in the composition, it is of interest to note that the cofiring of the excess beryllia with the rest of the ingredient material gives favorable opportunity for the formation of some beryllium silicate; that zinc and beryllium silicates are isomorphous; and that while zinc can replace beryllium in its orthosilicate, the reverse displacement does not take place. The most that need be said, perhaps, is that the cofired excess beryllia is somehow stabilizingly combined and held in the complex.

Whatever its relation to the rest of the complex, the cofired excess of beryllia not only stabilizes the luminescent material against the usual substantial decline of apparent fluorescent output, but also reduces the sintering of the complex in firing, and the grinding afterward required, if any. While an excessive temperature of firing should be avoided, yet to attain the desired stabilizing effect it has been found necessary to fire the material at relatively high temperature, around 1220–1260° C., as compared with the temperature of some 1100–1150° C. described in the Roberts patent cited above. A firing time of about two hours is suitable.

What has been said regarding excess beryllium in my composition applies equally to the equivalents therefor described above—magnesium or even aluminum—except that they are only equivalents for the non-color-influencing excess of beryllium, and not for the color-determinative or influencing portion. In such a substitution of magnesium, for example, the composition is compounded with the amount of beryllia required to produce the desired quality and intensity of fluorescent light, and magnesia is included in lieu of the excess of beryllia over this amount.

It would seem that the beneficial excess of beryllia (or the equivalent magnesia), which does not appear to form an intimate part of the phosphor functionally, produces its effect on fluorescent maintenance by controlling some condition in the lamp on which depends either the excitation of the phosphor by the radiation produced in the lamp, or the actual output or "escape" of the fluorescent light. Moreover, there is reason to believe that the excess beryllia or the like largely prevents ions of the working substance in the lamp (usually mercury) from superficially penetrating and darkening the luminescent particles. Such darkening of these particles must needs act as a screen or filter for the exciting radiation from the lamp discharge, as well as for the fluorescent light due to the actual phosphor excitation.

Naturally, the relative proportions of the essential components in my luminescent material and of the batch ingredients used for its preparation may vary according to the special quality of fluorescent light that is desired, and according to other luminescent materials or phosphors with which it is mixed when applied to fluorescent lamps—whether for "daylight," "soft white light," or "white light of 3500° K. color temperature"— using the common trade designations for the usual varieties of fluorescent white light. For this purpose, the percentage of magnanese may be increased or decreased as required to give the exact hue desired. Variation of the stabilizing beryllium component (or its equivalent) is permissible without regard to the quality or intensity of fluorescence that is desired. And in lieu of the oxides that have been mentioned, other materials that yield these oxides when heated may be used as batch ingredients, such as nitrates or carbonates, and silicic acid, for instance. The batch materials used should be of high purity, preferably at least C. P. grade; and when silicic acid is used, a grade with a content of 85–95 per cent $SiO_2$ is very suitable.

By way of specific example, I give a preferred percentage formula and directions suitable for preparing a phosphor to be mixed with fluorescent magnesium tungstate to give a white light corresponding to a color temperature of 3500° K.:

|  | Grams |
| --- | --- |
| Zinc oxide (ZnO) | 65 |
| Beryllia (BeO) | 3½ |
| Manganese carbonate ($MnCO_3$) to give manganese oxide (MnO) amounting to | 3¾ |
| Silicic acid ($SiO_2 \cdot xH_2O$) to give silica ($SiO_2$) amounting to | 27¾ |

After these ingredients have been mixed together in a finely divided state, the dry batch mixture may be thoroughly ball-milled until strong caking of the charge occurs, requiring about one hour in a 2 quart ball mill. After ball-milling, the batch may be brushed through a 100 mesh screen to aerate it in compensation for air expelled during the milling, and to assure an ultimate fine, soft, powdered product that requires no grinding after firing. The screened mixture may be fired or calcined in a refractory crucible (as of porcelain, silica, or alundum) in a refractory electric muffle furnace, with exposure to the atmospheric air during the firing. The firing temperature should be about 1220–1260° C., and may be held for about two hours. After cooling, the phosphor product may be sieved through a 100 mesh screen, or ball-milled again for 10 minutes, when it is ready for use. It may be applied to fluorescent tubes with the aid of a carbonaceous binder in the usual manner. Any ball-milling to incorporate the phosphor powder in the binder should preferably be brief.

When it is desired to use magnesium oxide instead of the excess of beryllia in the foregoing batch mixture, the mixture may be about as follows:

|  | Grams |
| --- | --- |
| Zinc oxide (ZnO) | 65 |
| Beryllia (BeO) | 3 |
| Magnesia (MgO) | 1 |
| Manganese carbonate ($MnCO_3$) to give MnO amounting to | 3½ |
| Silicic acid ($SiO_2 \cdot xH_2O$) to give $SiO_2$ amounting to | 28 |

In order to make clearer the peculiarities of my luminescent material already explained, the drawings graphically illustrate its properties as determined from tests of specimens prepared under identical conditions with various different amounts of beryllia (BeO), but with identical amounts of manganese oxide, zinc oxide, and silica, and all characterized by the partial molar ratio of $ZnO:SiO_2=1.7$. In the drawing, Fig. 1 is a chart showing the relation between the beryllium content of the phosphors and their fluorescent output under 2537 Å. excitation (both total and red), measured with suitable filters and photocells, and plotted according to an arbitrary standard of brightness.

Figure 2:
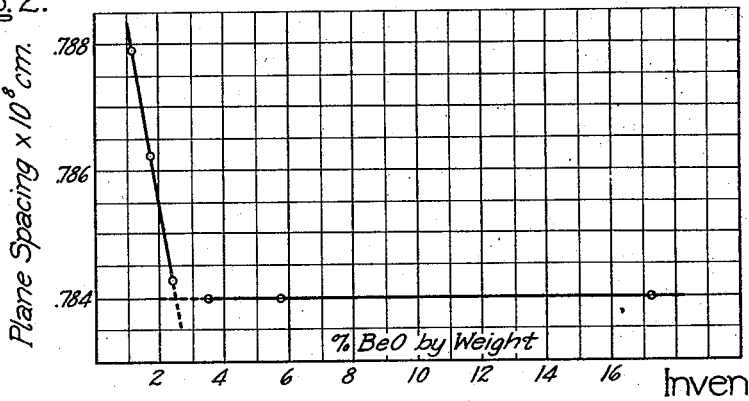

Fig. 2 is a chart showing the relation between the beryllium content of a phosphor and the plane-spacing of its crystal lattice as obtained by X-ray determinations, plotted to an arbitrary scale.

On both charts, points corresponding to the six phosphor samples represented are indicated by circles, while the curves are drawn with due regard for the margin of possible experimental error in the determinations. Both charts show the percentages of beryllia (BeO) by weight as abscissae; while Fig. 1 shows as ordinates the fluorescent outputs, and Fig. 2 the plane-spacings of the crystal lattices.

Considering the curves in Fig. 1, it will be seen that with increase of beryllia the total fluorescent output at first diminishes in brightness, while the red output (which is the part most valuable for the production of white light approximating black body radiation) increases in brightness. Constancy of radiation is suddenly reached with about 2¾ per cent of beryllia for the total output, and with about 2½ per cent for the red, and is maintained up to about 3 per cent of beryllia for both total output and red. Beyond this, both total and red outputs decline at a gradual but progressively increasing rate. It is noteworthy that the total output remains unchanged while the beryllia is nearly trebled, and the red remains constant while the beryllia is more than trebled. Thereafter both total and red outputs are reduced only about ½ per cent each while the beryllia is more than doubled.

Correspondingly, Fig. 2 shows a regular straight-line reduction of crystal lattice plane spacing up to about 2½ per cent beryllia, with no change of spacing whatever while the content of beryllia is thereafter increased about seven-fold. This indicates clearly that the reduction in brightness shown in Fig. 1 for increase of beryllia beyond 3 per cent is a dilution effect, though not at all commensurate with the increasing degree of dilution. As already hereinbefore indicated, the phosphors lying on the horizontal portions of the curves give improved maintenance in lamps with increasing amounts of beryllia from 2½ per cent to some 4 per cent, though they show no appreciable falling off in output due to the diluent effect of increasing beryllia until after this 4 per cent is considerably exceeded. Obviously it is these "horizontal line" phosphors with more than the fully functional amount of BeO and less than a diluent amount of BeO that are to be preferred in practice.

What I claim as new and desire to obtain by Letters Patent of the United States is:

1. A luminescent material of the character described having an improved maintenance stability of fluorescent brightness in the presence of a low-pressure mercury vapor discharge and consisting essentially of a complex of silica with zinc, beryllium, and maganese oxides cofired and thereby intimately combined together, in substantially the following proportions by weight:

| | |
|---|---|
| ZnO | 65 |
| BeO | 3½ |
| MnO | 3¾ |
| SiO$_2$ | 27¾ |

2. A luminescent material of the character described having an improved maintenance stability of fluorescent brightness in the presence of a low-pressure mercury vapor discharged and consisting essentially of a complex of silica with zinc, beryllium, magnesium, and manganese oxides cofired and thereby intimately combined together, in substantially the following proportions by weight:

| | |
|---|---|
| ZnO | 65 |
| BeO | 3 |
| MgO | 1 |
| MnO | 3½ |
| SiO$_2$ | 28 |

3. A luminescent composition or phosphor, adapted for reddish fluorescence in low-pressure mercury vapor discharge devices, composed essentially of an orthosilicate including silica intimately combined with zinc oxide where in the mol ratio of zinc oxide to silica as approximately 1.7 to 1 and having manganese oxide and beryllium oxide, in solution with said zinc oxide and silica, for activating the composition and for influencing the fluorescent color, and a cofired stabilizing and non-color influencing oxide of a metal of the group consisting of beryllium and magnesium, all in a complex which consists essentially of the orthosilicate and the stabilizing oxide, the sum of the zinc oxide and the beryllium oxide which are in solution bearing to the total amount of silica a mol ratio ranging from about 1.8:1 to 1.9:1, while the cofired stabilizing oxide aforesaid occurs in an amount ranging from 20 per cent to 400 per cent of the beryllium oxide which is in solution to provide improved maintenance stability of fluorescent brightness in the presence of a low pressure mercury vapor discharge.

4. A luminescent composition or phosphor, adapted for reddish fluorescence in low-pressure mercury vapor discharge devices, composed essentially of silica intimately combined in solution with zinc, manganese and beryllium oxides, all calcined together and forming an orthosilicate, said manganese and beryllium oxides constituting activating and color influencing constituents, and an excess of beryllium oxide over that which influences the fluorescent color as aforesaid, held in stabilizing relation in a complex comprising said orthosilicate and the excess beryllium oxide as a result of being fired together, the total amount of zinc oxide and of silica bearing to one another approximately a mol ratio of 1.7 to 1, and the sum of zinc oxide and beryllium oxide which are in solution as color determinative constituents in the orthosilicate bearing to the total amount of silica a mol ratio ranging from about 1.8:1 to about 1.9:1, while the stabilizing beryllium oxide aforesaid occurs in a substantial excess over that included in the last-mentioned mol ratio in an amount ranging from 20 per cent to 400 percent of the beryllium oxide which is in solution.

5. A luminescent composition or phosphor, adapted for reddish fluorescence in low-pressure mercury vapor discharge devices, composed essentially of silica intimately combined with zinc, and including manganese and beryllium oxides as activating and color influencing constituents in an orthosilicate, and magnesium oxide fired with said orthosilicate to form a complex therewith, the partial mol ratio of zinc oxide to silica being about 1.7 to 1, and the sum of the mol ratios of zinc oxide and beryllium oxide to silica ranging from about 1.8:1 to about 1.9:1, the magnesium oxide being in excess over the orthosilicate proportions in an amount ranging from 20 per cent to 400 per cent of the beryllium oxide to provide improved maintenance stability of fluorescent brightness in the presence of a low-pressure mercury vapor discharge.

HERMAN C. FROELICH.

REFERENCES CITED

The following references are of record in the file of this patent:

UNITED STATES PATENTS

| Number | Name | Date |
| --- | --- | --- |
| 2,118,091 | Leverenz | May 24, 1938 |
| 2,245,414 | Roberts | June 10, 1941 |
| 2,274,272 | Leverenz | Feb. 24, 1942 |

FOREIGN PATENTS

| Number | Country | Date |
| --- | --- | --- |
| 554,224 | Great Britain | Apr. 2, 1942 |